July 15, 1952 — A. J. RICHERT — 2,603,496

SELF-TIGHTENING COLLET

Filed Oct. 12, 1950

Inventor:
Abraham J. Richert,
by Ernest C. Britton
His Attorney.

Patented July 15, 1952

2,603,496

UNITED STATES PATENT OFFICE 2,603,496

SELF-TIGHTENING COLLET

Abraham J. Richert, Fort Wayne, Ind., assignor to General Electric Company, a corporation of New York Application October 12, 1950, Serial No. 189,786

6 Claims. (Cl. 279—72)

This invention relates to collets and more particularly to a self-tightening collet which will readily slip onto a shaft when it is stationary and which will firmly grip the shaft whenever torque is applied in either direction.

In the testing of small rotating apparatus, such as fractional horsepower motors, various test pulleys are held on the shaft of the motor with some type of collet. The provision of a self-tightening collet which can be slipped onto the motor shaft when it is stationary, which will firmly grip the shaft whenever torque is applied either by the shaft or by the test pulley, and which will release the shaft and be readily removable when the shaft stops rotating, is highly desirable for such an application. Furthermore, a self-tightening collet is advantageous for other uses, for example, in chucks and various other forms of drives.

An object of this invention is to provide an improved collet.

Another object of this invention is to provide a self-tightening collet which may be readily slipped onto a shaft when it is stationary and which will firmly grip the shaft whenever torque is applied in either direction.

Further objects and advantages of this invention will become apparent and the invention will be better understood by reference to the following description and the accompanying drawing, and the features of novelty which characterize this invention will be pointed out with particularity in the claims annexed to and forming a part of the specification.

In accordance with this invention, an outer sleeve member is provided having a cavity formed therein with an inner sleeve member arranged in the cavity. The inner sleeve member is provided with a plurality of longitudinal slots in which rollers are arranged. A gripping collet comprising a plurality of segments equal in number to the number of inner sleeve member slots is arranged within the inner sleeve member and is adapted to slidably engage a shaft inserted therein. Each of the segments has a flat formed on its outer surface upon which the rollers respectively rest. When torque is applied to either the outer sleeve member or the gripping collet, the rollers cause a wedging action between the inner surface of the outer sleeve and the collet segments, thus causing the collet segments to automatically grip the shaft. This gripping continues as long as torque is applied; however, when torque is released, the wedging action ceases and the collet segments are again loose so that the device may be readily removed from the shaft.

Figure 4:
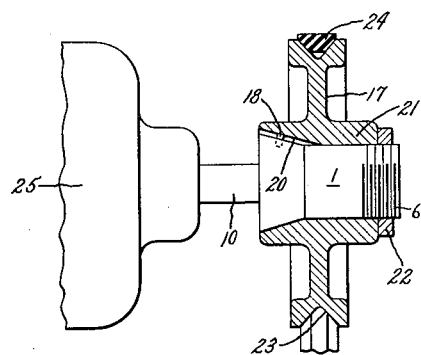
Figure 1:
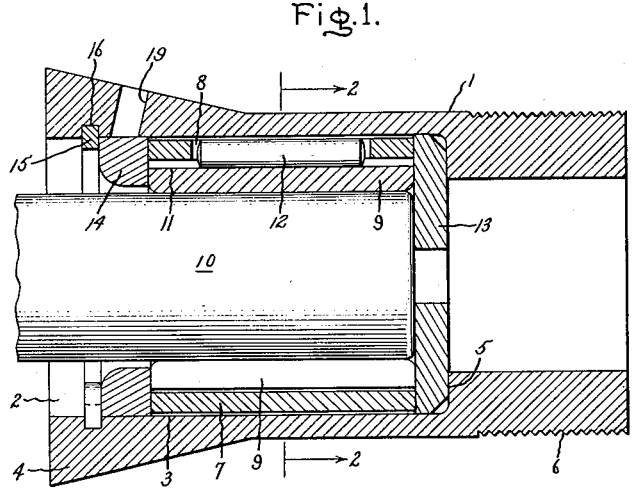
Figure 2:
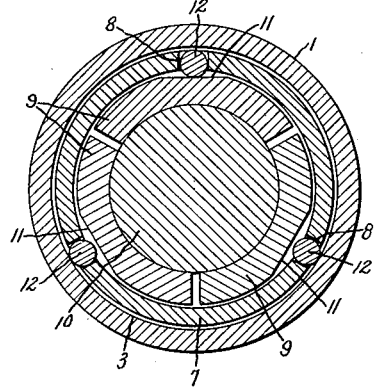
Figure 3:
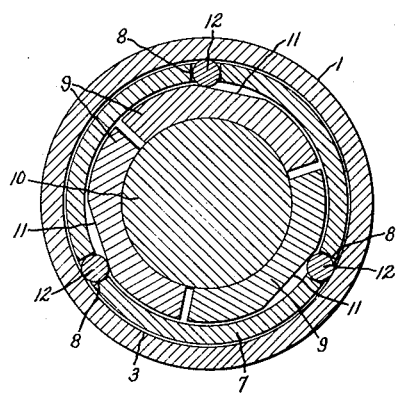

In the drawing, Fig. 1 is a side elevational view, partly in section, illustrating the improved self-tightening collet of this invention; Fig. 2 is a cross-sectional view taken along the line 2—2 of Fig. 1 illustrating the collet before torque is applied; Fig. 3 is a cross-sectional view similar to Fig. 2 illustrating the relative position of parts in the driving position; and Fig. 4 illustrates the application of the improved self-tightening collet of this invention with a test pulley.

Referring now to Fig. 1, there is shown an outer sleeve member 1 having a cavity 2 formed therein, preferably provided with a ground inner surface 3. The exterior surface of the outer sleeve member 1 is provided with an outwardly tapering portion 4 and an interior shoulder portion 5. Threads 6 are formed on the exterior surface of the outer sleeve member 1 on its end remote from the outwardly tapering portion 4 in order to secure a device to the collet such as a pulley or a chuck. Arranged in the cavity 2 of the outer sleeve member 1 and spaced from the inner surface 3 thereof is an inner sleeve member 7 provided with a plurality of longitudinal slots 8 formed therein. Arranged within the inner sleeve member 7 is a gripping collet formed of a plurality of individual and spaced-apart collet segments 9, equal in number to the slots 8 in the inner sleeve member 7. In the normal position, as shown in Fig. 2, the inner surfaces of the collet segments 9 are adapted to slidingly engage a shaft or tool shank 10 so that the device may be readily slid onto the shaft when it is stationary.

Each of the collet segments 9 is formed with a flat surface 11 on its outer surface, and a plurality of engaging rollers 12 are arranged in the slots 8. It will thus be seen that the radial dimension of the collet segments 9 is smaller at the mid-point of the flat 10 than at the remainder of their outer surfaces. The rollers 12 have a cross-sectional diameter greater than the radial width of the inner sleeve member 7 and smaller than the spacing between the inner surface 3 of the outer sleeve member and the outer surfaces of the collet segments 9. Therefore, as shown in Fig. 2, with no torque applied to the device, the rollers 12 will rest either on the flats 11 or on the inner surface 3 of the outer sleeve member 1, depending upon their relative position. As will be seen, with particular reference to Fig. 2, the inner sleeve member 7 accurately spaces the rollers 12 so that they are normally respectively aligned with the mid-points of the flats 11. As shown in Fig. 3, when torque is applied to either the outer sleeve member 1 or the collet segments 9, the rollers 12 are rolled toward the outer extremities of the flats 11 and thus cause a wedging action between the inner surface 3 of the outer sleeve member 1 and the outer extremities of the flats 11, causing the collet segments 9 to be forced against the shaft 10 to automatically produce a gripping action. It will be readily seen that this gripping action will continue as long as torque is being applied to the device and also that the device is operable in either direction, i. e., for either direction of rotation of the shaft 10 or of the outer sleeve member 1. When torque ceases to be applied, i. e., when either the shaft 10 or the outer sleeve member 1 stops rotating, the wedging action of the rollers 12 ceases and the pressure on the collet segments 9 is released. Therefore, the sliding engagement of the collet segments 9 with the shaft 10 is restored and the device can be readily removed from the shaft.

In the assembly of the device, a stop washer 13 is provided at the base of the cavity 2 abutting the shoulder portion 5 of the outer sleeve member 1. The inner sleeve member 7 and collet segments 9 are seated against the stop washer 13 and are retained in assembled position by an annular retainer 14 and snap ring 15 positioned in a suitable annular groove 16 formed in the inner surface 3 of the cavity 2.

Referring now to Fig. 4, there is shown a test pulley 17 mounted on the outer sleeve member 1. The pulley 17 is held on the outer sleeve member 1 by means of a pin 18 arranged in opening 19 in the tapered portion 4 of the outer sleeve member 1 and engaging a keyway 20 in the hub 21 of the pulley 17. A nut 22 threadingly engages the thread 6 on the outer sleeve member 1 and retains the pulley 17 on the outer sleeve member. It will now be readily apparent that the test pulley 17, which may be provided with a suitable groove 23 in which a V-belt 24 may be arranged, by virtue of its mounting on the self-tightening collet described above, may be slid onto the shaft 10 of a test motor 25 when the shaft is stationary and will be tightly secured to the shaft when torque is applied to either the shaft or the pulley. Whenever the torque ceases, the gripping action of the collet ceases and the test pulley with its attached self-tightening collet may be readily removed from the shaft.

It will now be readily apparent that this invention provides an improved collet device which may be readily slid onto a shaft or tool shank and which will automatically tightly grip the shaft or shank whenever torque is applied. The gripping action is released automatically whenever the torque is released permitting the device to be readily removed from the shaft without the necessity of utilizing any tools and furthermore the device is operable in either direction of rotation.

While I have illustrated and described a specific embodiment of this invention, further modifications and improvements will occur to those skilled in the art, and I desire it to be understood, therefore, that this invention is not limited to the embodiment shown and I intend in the appended claims to cover all modifications which do not depart from the spirit and scope of the claims.

What I claim as new and desire to secure by Letters Patent of the United States is:

1. A self-tightening collet comprising an outer sleeve member having a cavity formed therein, an inner sleeve member arranged in said cavity and having a plurality of longitudinal slots formed therein, a gripping collet arranged within said inner sleeve member comprising a plurality of segments equal in number to said inner sleeve member slots and respectively having their inner circumferential surfaces arranged to receive and circumferentially grip a shaft removably inserted therein, each of said segments having a flat formed on its outer surface, and a plurality of rollers respectively arranged in said inner sleeve member slots and adapted to rest on said collet segment flats whereby application of torque to said outer sleeve member or said gripping collet segments causes said rollers to wedge between the inner surface of said outer sleeve member and said collet segment flats so that said collet segments tightly grip said shaft.

2. A self-tightening collet comprising an outer sleeve member having a cylindrical cavity formed therein, a cylindrical inner sleeve member arranged in said cavity and having a plurality of evenly spaced longitudinal slots formed therein, a cylindrical gripping collet arranged within said inner sleeve member comprising a plurality of semi-circular segments equal in number to said inner sleeve member slots and respectively having their inner circumferential surfaces arranged to receive and initially circumferentially grip a shaft removably inserted therein with a slip fit, each of said segments having a flat formed on its outer surface, and a plurality of rollers respectively arranged in said inner sleeve member slots and adapted to rest on said collet segment flats whereby application of torque to said outer sleeve member or said gripping collet segments causes said rollers to wedge between the inner surface of said outer sleeve member and said collet segment flats so that said collet segments tightly grip said shaft.

3. A self-tightening collet comprising an outer sleeve member having a cylindrical cavity formed therein, a cylindrical inner sleeve member arranged in said cavity and having a plurality of evenly spaced longitudinal slots formed therein, a cylindrical gripping collet arranged within said inner sleeve member comprising a plurality of semi-circular segments equal in number to said inner sleeve member slots and respectively having their inner circumferential surfaces arranged to receive and initially circumferentially grip a shaft removably inserted therein with a slip fit, means for retaining said inner sleeve member and said gripping collet within said outer sleeve member cavity, each of said segments having a flat formed on its outer surface, and a plurality of rollers respectively arranged in said inner sleeve member slots and adapted to rest on said collet segment flats whereby application of torque to said outer sleeve member or said gripping collet segments causes said rollers to wedge between the inner surface of said outer sleeve member and said collet segment flats so that said collet segments tightly grip said shaft.

4. A self-tightening collet comprising an outer sleeve member having a cylindrical cavity formed therein, a cylindrical inner sleeve member arranged in said cavity and spaced from the inner surface of said outer sleeve member, said inner sleeve member having a plurality of evenly spaced longitudinal slots formed therein, a cylindrical gripping collet arranged within said inner sleeve member and spaced therefrom comprising a plurality of spaced-apart semi-circular segments equal in number of said inner sleeve member slots and respectively having their inner circumferential surfaces arranged to receive and initially circumferentially grip a shaft removably inserted therein with a slip fit, each of said segments having a flat formed on its outer surface, and a plurality of rollers respectively arranged in said inner sleeve member slots and retained thereby; the diameter of said rollers being greater than the thickness of said inner sleeve member, greater than the distance between the inner surface of said outer sleeve member and the outer surface of said collet segments, and less than the distance between the inner surface of said outer sleeve member and the mid-point of said collet segment flats whereby application of torque to said outer sleeve member or said gripping collet segments causes said rollers to wedge between the inner surface of said outer sleeve member and the outer extremities of said collet segment flats so that said collet segments tightly grip said shaft.

5. A self-tightening collet comprising an outer sleeve member, an inner sleeve member arranged within said outer sleeve member and having a plurality of longitudinal slots formed therein, a gripping collet arranged within said inner sleeve member and comprising a plurality of segments respectively having their inner circumferential surfaces arranged to receive and circumferentially grip a shaft removably inserted therein, each of said segments having a portion of its outer surface formed with a smaller radial dimension than the remaining portion thereof, and a plurality of rollers respectively arranged in said inner sleeve member slots adapted to normally rest on either the inner surface of said outer sleeve member or the mid-points of said first-named segment portions whereby application of torque to said outer sleeve member or said collet segments causes said rollers to wedge between the inner surface of said outer sleeve member and said first-named segment portions so that said collet segments tightly grip said shaft.

6. A self-tightening collet comprising an outer member, gripping means arranged within said outer member and having its inner circumferential surface arranged to receive and initially circumferentially grip a shaft removably inserted therein with a slip fit, said gripping means having a plurality of surfaces having a smaller radial dimension than the remaining outer surface thereof, a plurality of rolling means arranged between said gripping means surfaces and the inner surface of said outer member, and means for retaining and spacing said rolling means whereby application of torque to said outer member or said gripping means causes said rolling means to wedge between the inner surface of said outer member and said gripping means surfaces so that said gripping means tightly engages said shaft.

ABRAHAM J. RICHERT.

REFERENCES CITED

The following references are of record in the file of this patent:

UNITED STATES PATENTS

| Number | Name | Date |
| --- | --- | --- |
| 1,283,173 | Heinkel | Oct. 29, 1918 |
| 1,697,868 | Henricson | Jan. 8, 1929 |
| 1,748,511 | Johnson | Feb. 25, 1930 |